United States Patent [19]

Urashima et al.

[11] Patent Number: 4,880,756

[45] Date of Patent: Nov. 14, 1989

[54] SILICON NITRIDE SINTERED PRODUCT

[75] Inventors: Kazuhiro Urashima; Masakazu Watanabe; Yo Tajima; Kenji Nakanishi, all of Aichi, Japan

[73] Assignee: NGK Spark Plug Co., Ltd., Aichi, Japan

[21] Appl. No.: 238,429

[22] Filed: Aug. 31, 1988

[30] Foreign Application Priority Data

Sep. 2, 1987 [JP] Japan .................................. 62-219961
Apr. 15, 1988 [JP] Japan .................................. 63-94354

[51] Int. Cl.$^4$ ............................................. C04B 35/58
[52] U.S. Cl. ....................................................... 501/97
[58] Field of Search ....................................... 501/97, 98

[56] References Cited

U.S. PATENT DOCUMENTS

| | | | |
|---|---|---|---|
| 4,449,989 | 5/1984 | Sarin et al. | 51/295 |
| 4,764,490 | 8/1988 | Yamakawa et al. | 501/97 |
| 4,777,822 | 10/1988 | Uemura et al. | 72/366 |

FOREIGN PATENT DOCUMENTS

| | | | |
|---|---|---|---|
| 2800174 | 7/1979 | Fed. Rep. of Germany | 501/97 |
| 57-71871 | 5/1982 | Japan | 501/97 |
| 57-166371 | 10/1982 | Japan | 501/97 |
| 57-188468 | 11/1982 | Japan | 501/97 |
| 58-64275 | 4/1983 | Japan | 501/97 |
| 58-151371 | 9/1983 | Japan | 501/98 |
| 59-190271 | 10/1984 | Japan | 501/97 |
| 59-190272 | 10/1984 | Japan | 501/97 |
| 60-65766 | 4/1985 | Japan | 501/97 |
| 60-131865 | 7/1985 | Japan | 501/97 |
| 61-1178472 | 11/1986 | Japan. | |

Primary Examiner—William R. Dixon, Jr.
Assistant Examiner—David M. Brunsman
Attorney, Agent, or Firm—Sughrue, Mion, Zinn, Macpeak & Seas

[57] ABSTRACT

A silicon nitride sintered product comprises, in % by weight, 1 to 10% Mg, calculated as MgO, 1 to 10% Zr, calculated as $ZrO_2$, 0.1 to 2.0% of at least one of Al, calculated as $Al_2O_3$, Li, calculated as $Li_2O$, and Na, calculated as $Na_2O$, and the remainder being $Si_3N_4$ and unavoidable impurities.

2 Claims, No Drawings

SILICON NITRIDE SINTERED PRODUCT

FIELD OF THE INVENTION

This invention relates to silicon nitride sintered product, particularly to silicon nitride sintered product improved in resistance against chipping and wear.

The silicon nitride sintered product of this invention is suitably used for wear resistant industrial members such as cutting tools and the like.

BACKGROUND OF THE INVENTION

Known additive components suitably employed for cutting tools are MgO and $ZrO_2$ as disclosed in JP-B-60-16388 and 60-20346 (the term "JP-B" as used herein means an "examined Japanese patent publication"). $Al_2O_3$, WC, $Y_2O_3$, etc., are also disclosed in JP-A-56-73670 (the term "JP-A" as used herein means an "unexamined published Japanese patent application"). Further, though not being limited to cutting tools, addition of magnesia-alumina spinel and partially stabilized $ZrO_2$ is disclosed in JP-A-60-77174 to improve mechanical properties.

The above-mentioned conventional techniques are useful for improving strength and toughness; in addition to such improvements, however, further reduction of wear is required to prolong a tool life.

SUMMARY OF THE INVENTION

The object of the present invention is to provide a silicon nitride sintered product improved in resistances against chipping and wear to meet the above requirements.

According to the present invention, there is provided a silicon nitride sintered product comprising by weight,
1 to 10% Mg (calculated as MgO),
1 to 10% Zr (calculated as $ZrO_2$),
0.1 to 2.0% at least one of Al (calculated as $Al_2O_3$), Li (calculated as $Li_2O$) and Na (calculated as $Na_2O$) and
the remainder being $Si_3N_4$ and unavoidable impurities.

DETAILED DESCRIPTION OF THE INVENTION

Components Mg, Zr, Al, Li and Na contribute to product densification by forming liquid phase in the interstices between $Si_3N_4$ particles together with Si, N and O during the firing, and also bond $Si_3N_4$ particles by glassification during cooling. Especially, Al, Li and Na enhance bonding strength of $Si_3N_4$ particles in the intergrannular phase and avoid debonding of $Si_3N_4$ particles during abrasion. When the bonding strength is appropriate, the so-called "pull-out", i.e., a pulling out phenomenon of $Si_3N_4$ columnar crystal, occurs, so that stress concentration at the tip of the crack is considerably reduced to give high toughness to the sintered product. In this respect Al is the most effective among Al, Ni and Na. Al reinforces bonding of $Si_3N_4$ particles, and avoids debonding of $Si_3N_4$ particles during abrasion. A part of the Zr is often incorporated as represented by $ZrO_xN_yC_z$ in the sintered product.

The reason for limiting the respective contents of Mg and Zr as 1 to 10% by weight each (calculated as MgO and $ZrO_2$, respectively) is given below. When the amount is less than 1%, no densification is attained, whereas an amount exceeding 10% leads to an excess formation of intergranular phase that neither high toughness nor high strength is achieved. The amount of at least one of Al, Li and Na is limited to 0.1 to 2.0% by weight in oxide base, since when the addition is lower than said limit, debonding of $Si_3N_4$ particles occurs during abrasion due to insufficient adhesion strength between the $Si_3N_4$ particles, leading the deterioration of wear resistance. When an addition exceeds 2.0%, on the other hand, the bonding strength of the $Si_3N_4$ particles in the intergranular phase becomes too strong, thereby depressing the "pullout" phenomenon and avoiding toughening thereof.

The sintered product of the present invention can be obtained, for instance, by firing a mixture of Mg compounds, Zr compounds, and compounds of at least one of Al, Li, and Na, which may give oxides when each is solely fired, wherein the mixture comprises, in an oxide base, by weight, 1 to 10% Mg, 1 to 10% Zr, and 0.1 to 2.0% of at least one of Al, Li, and Na, and $Si_3N_4$ powder as the remainder. The mixture is molded and fired at 1,500 to 1,900° C. under nitrogen or an inert gas atmosphere. Preferable is gas pressure sintering, but is not limited thereto.

The gas-pressure sintering is carried out under overpressure of $N_2$ gas, typically in the range of 2 to 300 atoms, more preferably 5 to 100 atoms. Since the overpressure of $N_2$ gas suppresses decomposition of $Si_3N_4$ at high temperature, in the gas-pressure sintering higher sintering temperature can be employed to form fully dense sintered products.

As is clear from the above explanations, the silicon nitride sintered product of the present invention enables longer cutting tool life, maintaining the mechanical strength comparable to the conventional silicon nitride sintered products.

The present invention is hereinafter described in greater detail with reference to examples, which are not to be construed as limiting the scope thereof. Unless otherwise indicated, all parts, percents, and ratios are by weight.

EXAMPLES 1-5 AND COMPARATIVE EXAMPLES 6-9

$Si_3N_4$ powder having average particle size (diameter) or 0.7 μm and BET specific surface area of 10 m²/g, $MgCO_3$ powder having 20 m³/g, $ZrO_2$ powder having 10 m²/g, and $Al_2O_3$ powder having 10 m²/g were weighted out, as shown in Table 1, subjected to wet mixing for 16 hours using a pot mill with balls made of $Si_3N_4$, dried, and granulated to an average diameter of 250 μm. The powder granules were molded in a metal mold under a pressure of 1.5 ton/cm², and fired under conditions as shown in Table 1 to give silicon nitride sintered products of Nos. 1 to 9.

Flexural strength at room temperature according to Japanese Industrial Standard (JIS R1601), fracture toughness by IM method, and resistances against wear and chipping were measured on the sintered products of No. 1 to No. 9 and the results are shown in Table 1.

Regarding cutting property in Table 1, a wear resistance is shown as a flank wear width $V_B$, which was measured by using test piece formed by the method specified in JIS B4103, SNGN 432 with chamfer on 0.05 to machine a cutting material (JIS FC23) in 240 dia.×200 length, conditions such as cutting speed of 180 m/min, depth of cut of 1.0 mm, feed of 0.15 mm/rev. and cutting length of 800 mm. A chipping resistance is shown as number of disks which were successfully cut without chipping, using a test piece formed by the method specified in JIS B4103, SNGN432 with chamfer of 0.05 to machine a cutting material JIS FC23 having black skin, outer flank of the disk with an 11 mm thickness and an outer diameter of 200 mm in an axial direction under conditions of a cutting speed of 150 m/min, feed of 0.3 m/rev. and depth of cut of 2.0 mm.

No. 10 to No. 17. The properties are measured and the results are shown in Table 2.

TABLE 2

| Sample No. | Sintering Aid | | $Al_2O_3$ Addition (%) | $Li_2CO_3$ Addition (as $Li_2O$) (%) | $Na_2CO_3$ Addition (as $Na_2O$) (%) | Mechanical Properties | | Machining Properties | |
|---|---|---|---|---|---|---|---|---|---|
| | $MgCO_3$ (as MGO) (%) | $ZrO_2$ (%) | | | | Flexural Strength (kg/mm$^2$) | Toughness (MN/m$^{3/2}$) | Wear Resistance ($V_Bmm$) | Chipping Resistance |
| Example 10 | 5 | 5 | — | 1.0 | — | 85 | 6.1 | 0.22 | 123 |
| Example 11 | 5 | 5 | — | — | 1.0 | 83 | 6.0 | 0.20 | 150 |
| Example 12 | 3 | 7 | 0.8 | — | 0.5 | 91 | 6.5 | 0.18 | 166 |
| Example 13 | 3 | 7 | 0.7 | 0.3 | — | 90 | 7.0 | 0.17 | >200 |
| Example 14 | 5 | 5 | 0.5 | 0.5 | 0.5 | 88 | 6.6 | 0.18 | 152 |
| Comparative Example 15 | 5 | 5 | — | 3.0 | — | 78 | 5.0 | 0.36 | 8 |
| Comparative Example 16 | 5 | 5 | — | — | 3.0 | 81 | 4.9 | 0.39 | 8 |
| Comparative Example 17 | 5 | 5 | 1.5 | 1.0 | 1.0 | 75 | 4.9 | 0.36 | 10 |

As is seen in Table 2, both Li and Na had the same effect as Al on the sintered products.

While the invention has been described in detail and with reference to specific embodiments thereof, it will be apparent to one skilled in the art that various changes and modifications can be made therein without departing from the spirit and scope thereof.

TABLE 1

| Sample No. | Sintering Aid | | $Al_2O_3$ Addition (%) | Firing Condition | Mechanical Properties | | Machining Properties | | Remarks |
|---|---|---|---|---|---|---|---|---|---|
| | $MgCO_3$ (as MgO) (%) | $ZrO_2$ (%) | | | Flexural Strength (kg/mm$^2$) | Toughness (MN/m$^{3/2}$) | Wear Resistance ($V_Bmm$) | Chipping Resistance | |
| Example 1 | 5 | 5 | 0.2 | 1800° C./2H | 100 | 8.0 | 0.15 | >200 | |
| Example 2 | " | 5 | 0.5 | " | 95 | 8.0 | 0.15 | >200 | |
| Example 3 | " | 5 | 0.7 | 1800° C./2H N$_2$ 10 atm | 95 | 7.5 | 0.17 | 164 | |
| Example 4 | 3 | 7 | 1.5 | " | 88 | 6.3 | 0.17 | 143 | |
| Example 5 | 5 | 10 | 0.5 | " | 85 | 7.4 | 0.18 | 175 | |
| Comparative Example 6 | 5 | 5 | 0 | 1800° C./2H N$_2$ 80 atm | 102 | 8.2 | 0.45 | >200 | High Wear |
| Comparative Example 7 | " | 5 | 3.0 | 1800° C./2H N$_2$ 10 atm | 90 | 5.2 | 0.30 | 10 | Considerable chipping |
| Comparative Example 8 | 0 | 7 | 1.0 | 1800° C./2H N$_2$ 80 atm | 77 | 4.8 | 0.32 | 8 | " |
| Comparative Example 9 | 5 | 0 | 1.0 | " | 80 | 5.5 | 0.31 | 10 | " |

As is seen in Table 1, it is considered that sintered test piece No. 6 gave high wear due to $Al_2O_3$ deficiency, No. 7 showed poor toughness due to excess $Al_2O_3$, and test pieces No. 8 and No. 9 were not dense enough, due to the deficiency of Mg and Zr respectively, and were poor in overall properties.

EXAMPLES 10–14 AND COMPARATIVE EXAMPLES 16–17

$Li_2CO_3$ powder having a specific surface area of 8 m$^2$/g and $Na_2CO_3$ powder having 10 m$^2$/g were additionally used, and the powder mixtures, in the ratio shown in Table 2, were processed according to the same process as in Example 3 to give sintered products

What is claimed is:

1. A silicon nitride sintered product consisting essentially of, in % by weight:
   1 to 10% Mg, calculated as MgO;
   1 to 10% Zr, calculated as $ZrO_2$;
   0.1 to 2.0% of at least one of Al, calculated as $Al_2O_3$, Li, calculated as $Li_2O$, and Na, calculated as $Na_2O$; and
   the remainder being $Si_3N_4$ and unavoidable impurities.

2. A silicon nitride sintered product as in claim 1 consisting essentially of MgO, $ZrO_2$ and $Al_2O_3$ in the amounts specified, the remainder being $Si_3N_4$.

* * * * *